(12) United States Patent
Kaip et al.

(10) Patent No.: US 8,182,016 B2
(45) Date of Patent: May 22, 2012

(54) SWIVEL SEATING SYSTEM

(75) Inventors: Ronald J. Kaip, Macomb, MI (US);
David A. Bargiel, Troy, MI (US); Steven R. Swailes, Lapeer, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 12/326,136

(22) Filed: Dec. 2, 2008

(65) Prior Publication Data
US 2009/0174246 A1 Jul. 9, 2009

Related U.S. Application Data

(60) Provisional application No. 61/009,987, filed on Jan. 4, 2008.

(51) Int. Cl.
*B60N 2/14* (2006.01)
(52) U.S. Cl. ................. 296/65.06; 297/344.21
(58) Field of Classification Search ............... 296/65.05, 296/65.06, 65.11; 297/344.1, 344.21, 344.24, 297/344.26
See application file for complete search history.

(56) References Cited

U.S. PATENT DOCUMENTS

| | | | |
|---|---|---|---|
| 3,940,164 A * | 2/1976 | Non | 280/753 |
| 3,964,713 A * | 6/1976 | Joslyn et al. | 248/418 |
| 4,436,270 A * | 3/1984 | Muraishi | 248/416 |
| 4,600,239 A * | 7/1986 | Gerstein et al. | 297/344.23 |
| 4,611,854 A * | 9/1986 | Pfeiffer | 297/468 |
| 4,733,903 A * | 3/1988 | Bailey | 296/65.07 |
| 4,846,529 A * | 7/1989 | Tulley | 297/344.23 |
| 4,969,685 A * | 11/1990 | Chihaya et al. | 297/344.23 |
| 5,000,505 A * | 3/1991 | Kawashita et al. | 296/64 |
| 5,127,699 A * | 7/1992 | Maezawa et al. | 296/65.02 |
| 5,474,353 A * | 12/1995 | Koester et al. | 296/65.07 |
| 5,496,088 A * | 3/1996 | Stewart | 296/65.03 |
| 5,547,242 A * | 8/1996 | Dukatz et al. | 296/65.03 |
| 5,720,462 A * | 2/1998 | Brodersen | 248/425 |
| 5,762,398 A * | 6/1998 | Gonzalez et al. | 297/250.1 |
| 6,027,170 A * | 2/2000 | Benz et al. | 297/344.21 |
| 6,050,835 A * | 4/2000 | Henrion et al. | 439/247 |
| 6,155,626 A * | 12/2000 | Chabanne et al. | 296/65.03 |
| 6,161,892 A * | 12/2000 | Chabanne et al. | 296/65.03 |
| 6,186,573 B1 | 2/2001 | Thurab | |
| 6,199,949 B1 * | 3/2001 | DaSilva | 297/256.12 |
| 6,241,314 B1 * | 6/2001 | Pufall | 297/256.12 |
| 6,250,703 B1 * | 6/2001 | Cisler et al. | 296/65.03 |
| 6,279,981 B1 * | 8/2001 | Mesnage | 296/65.03 |
| 6,357,795 B1 * | 3/2002 | Krauss et al. | 280/801.1 |
| 6,457,694 B1 * | 10/2002 | Haynes et al. | 248/415 |
| 6,572,189 B1 * | 6/2003 | Blaymore | 297/256.12 |
| 6,752,445 B1 * | 6/2004 | Koehler et al. | 296/65.05 |
| 6,991,060 B2 | 1/2006 | Chernoff et al. | |
| 7,036,883 B1 | 5/2006 | Thompson et al. | |
| 7,156,442 B2 | 1/2007 | McManus et al. | |
| 7,204,554 B2 | 4/2007 | Wieclawski | |
| 7,284,989 B1 * | 10/2007 | Hanlon et al. | 439/34 |
| 7,566,073 B2 * | 7/2009 | Shin | 280/735 |
| 2001/0048237 A1 * | 12/2001 | Kassai et al. | 297/256.12 |
| 2002/0105203 A1 * | 8/2002 | Hansen et al. | 296/65.03 |
| 2006/0226685 A1 * | 10/2006 | Priepke et al. | 297/344.24 |
| 2007/0132288 A1 * | 6/2007 | Zuzga et al. | 297/217.3 |
| 2007/0170758 A1 * | 7/2007 | Allen et al. | 297/250.1 |

* cited by examiner

*Primary Examiner* — H Gutman
(74) *Attorney, Agent, or Firm* — Ralph E. Smith

(57) ABSTRACT

A seat assembly for a vehicle that is rotatable and removable. The seat assembly includes a seat bottom and a mounting assembly having a first portion that releasably attaches the seat bottom to the vehicle and a second portion. The second portion permits rotation of the seat bottom relative to the first portion and the vehicle and permits translation of the seat bottom relative to the first portion and the vehicle.

16 Claims, 11 Drawing Sheets

SWIVEL SEATING SYSTEM

CROSS REFERENCE TO RELATED APPLICATIONS

This application claims the benefit of U.S. Provisional Application No. 61/009,987 filed Jan. 4, 2008.

FIELD

The present invention relates to seating systems and more particularly to reconfigurable seating systems for vehicles.

BACKGROUND

Multi-passenger vehicles such as sport-utility vehicles and minivans are increasing in popularity due to the capability of such vehicles in transporting multiple passengers and/or large cargo. Such multi-passenger vehicles typically include up to three rows of passenger seats, which may be selectively positioned to adjust a seating configuration and/or storage area of the vehicle. For example, some vehicle seats include the ability to be dumped and stowed into a floor pan of the vehicle to allow a rear surface of the seat assembly to be used as a load floor, thereby increasing the overall cargo space of the vehicle.

While conventional vehicle seat assemblies may be moved from a stowed position to a use position to selectively provide the vehicle with additional cargo space, such seats are not pivotable between a forward-facing position and a rearward-facing position. Furthermore, while such seat assemblies may be selectively removed from the vehicle to increase the cargo space within the vehicle, such seats are not electrically connected to the vehicle when in use and, therefore, do not enjoy electrical functions such as powered movement of the vehicle seat (i.e., fore/aft, recline, etc.), power lumbar, and/or heated/cooled seats.

SUMMARY

A seat assembly for a vehicle includes a seat bottom and a mounting assembly having a first portion that attaches the seat bottom to the vehicle and a second portion. The second portion permits rotation of the seat bottom relative to the first portion and the vehicle and permits translation of the seat bottom relative to the first portion and the vehicle.

A vehicle includes a floor and a seat assembly. The seat assembly includes a seat bottom rotatably supported by the floor between a first position and a second position and is selectively translatable relative to the floor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
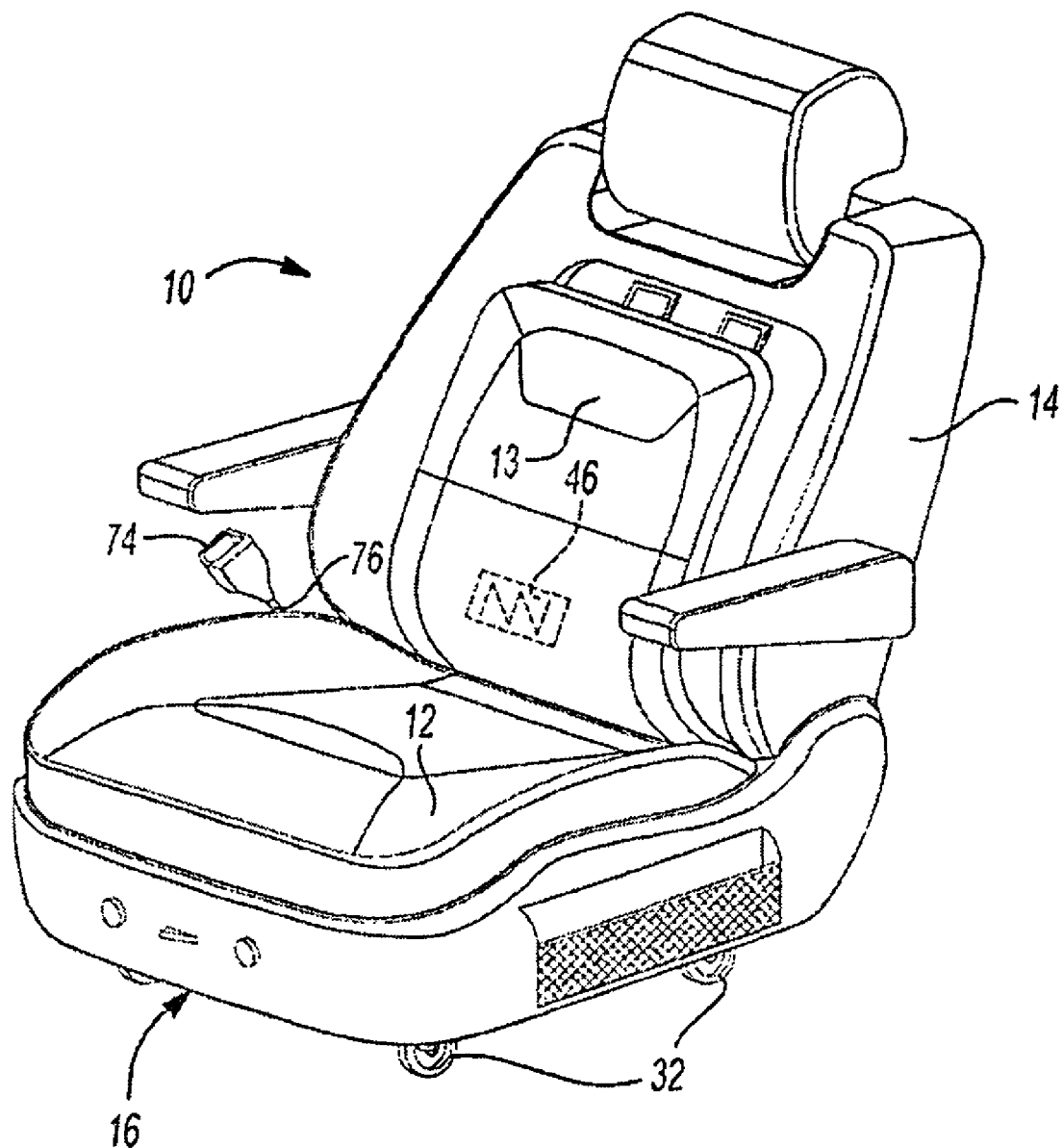
FIG. 1 is a perspective view of a seat assembly in accordance with one embodiment of the present invention.

The following description of the preferred embodiment(s) is merely exemplary in nature and is in no way intended to limit the invention, its application, or uses.

With reference to the figures, a seat assembly 10 is provided and includes a seat bottom 12, a seatback 14 pivotably supported by the seat bottom 12, and a mounting assembly 16 that permits rotation and translation of the seat assembly 10 relative to a vehicle 18.

Figure 2:
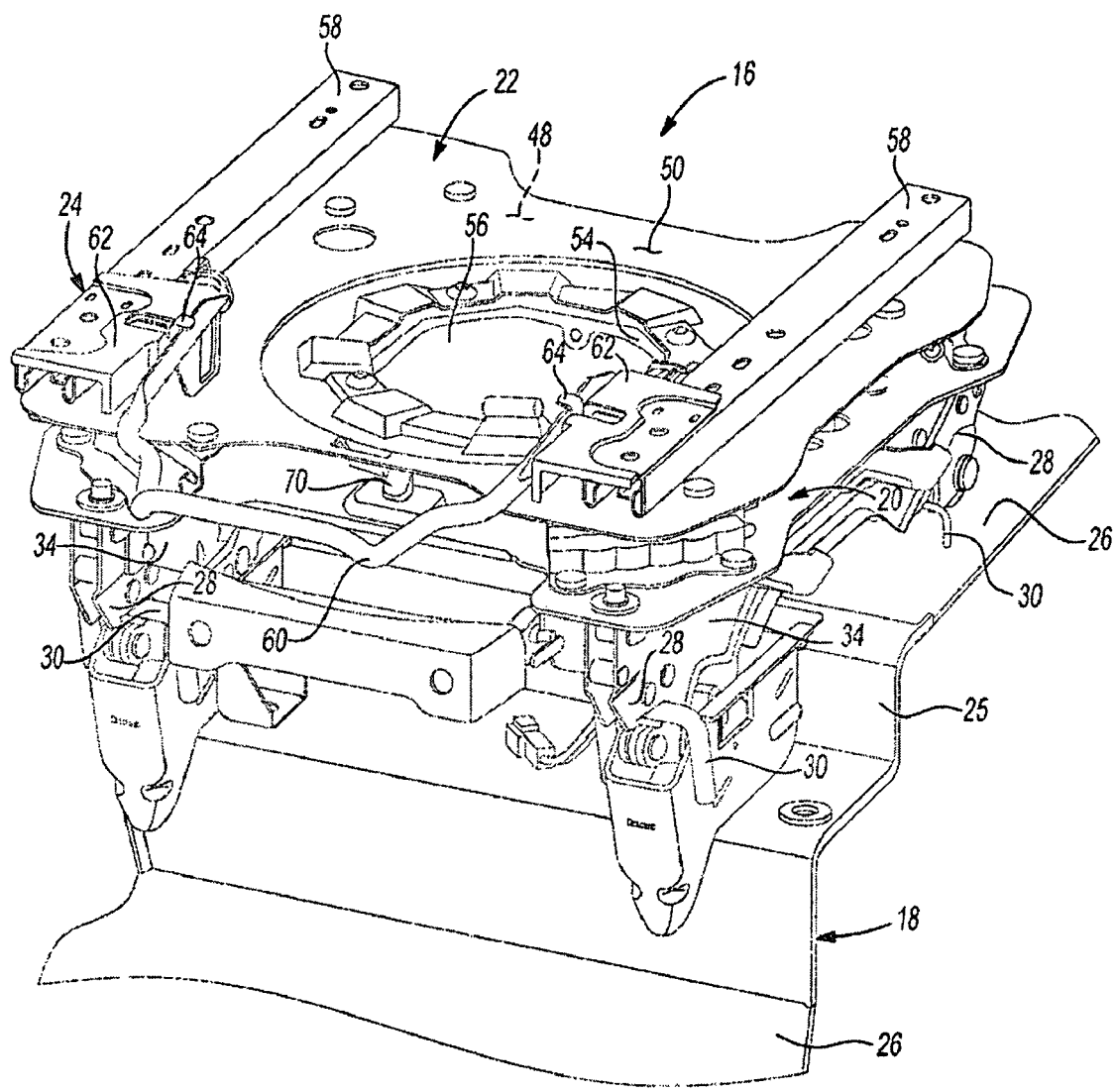
FIG. 2 is a perspective view of a swivel mechanism for use with the seat assembly of FIG. 1.
Figure 3:
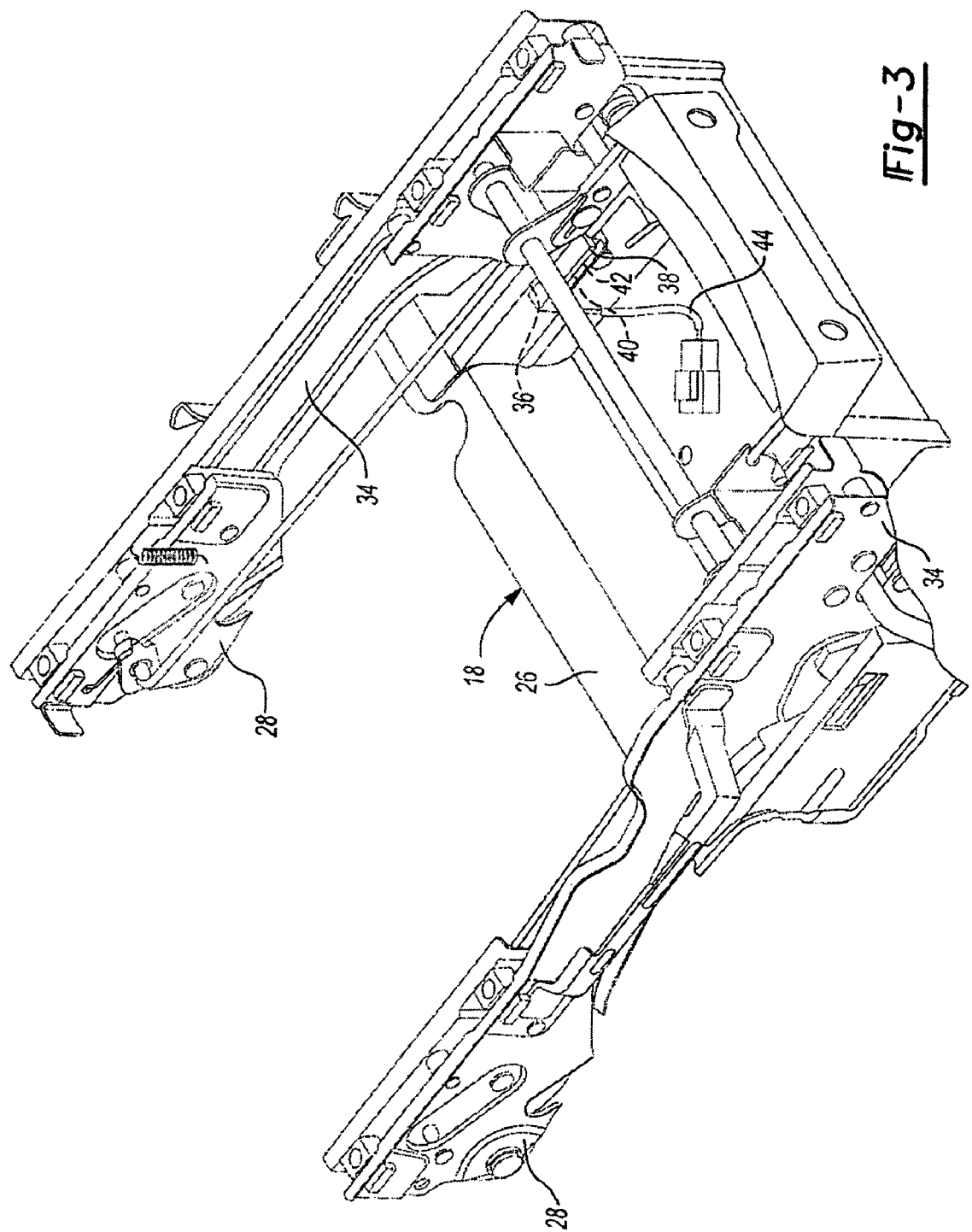
FIG. 3 is a perspective view of a seat structure of the seat assembly of FIG. 1 detailing an electrical connection between the seat assembly and an external structure.

With reference to FIG. 2, the mounting assembly 16 is shown to include a floor bracket 20, a seat bracket 22, and an adjustment mechanism 24. The floor bracket 20 may be fixedly attached to a floor bracket 25 of a floor 26 of the vehicle 18 and may include at least one floor-latch mechanism 28 extending therefrom. The floor-latch mechanism 28 may selectively engage a series of strikers 30 attached to the floor 26 of the vehicle 18 to selectively attach the floor bracket 20 to the floor 26 of the vehicle 18. Each floor-latch mechanism 28 may be movable between a latched state and an unlatched state to selectively attach the floor bracket 20 and, thus, the seat assembly 10, to the floor 26 of the vehicle 18. When the floor-latch mechanism 28 is in the latched state, each floor-latch mechanism 28 engages the strikers 30 to prevent removal of the seat assembly 10 from the vehicle 18. Conversely, when the floor-latch mechanisms 28 are in the unlatched state, the floor-latch mechanism 28 disengage the strikers 30 and permit removal of the seat assembly 10 from the vehicle 18.

The floor bracket 20 may also include a series of wheels 32 (FIG. 1) disposed on a bottom surface thereof. The wheels 32 facilitate movement of the seat assembly 10 when the seat assembly 10 is removed from the vehicle 18. For example, when the floor-latch mechanisms 28 are all moved into the unlatched state and the seat assembly 10 is removed from the vehicle 18, the wheels 32 may be moved into an extended position to allow the wheels 32 to engage the ground. Engagement between the wheels 32 and the ground facilitates movement of the seat assembly 10 towards and away from the vehicle 18. While the wheels 32 are described as being moved into an extended position when the seat assembly 10 is removed from the vehicle 18, the wheels 32 could alternatively be fixed relative to the floor bracket 20 such that when the floor bracket 20 is disengaged from the floor 26 of the vehicle 18, the wheels 32 are already in position to engage the ground to facilitate movement of the seat assembly 10 when removed from the vehicle 18.

As shown in FIG. 2, the floor-latch mechanisms 28 may be attached to the floor bracket 20 via a pair of mounting brackets 34. The mounting brackets 34 are positioned generally on inboard and outboard sides of the seat assembly 10 and may be integrally formed with the floor bracket 20. Alternatively, the mounting brackets 34 may be separately formed from the floor bracket 20 and then subsequently fixedly attached to the floor bracket 20 by a suitable fastener such as, for example, a rivet or a bolt. In either configuration, the mounting brackets 34 extend generally from the floor bracket 20 and away from the seat bottom 12 to allow the floor-latch mechanisms 28 to respectively engage strikers 30 disposed on the floor 26 of the vehicle 18.

Referring to FIGS. 3 and 9-11, one or both of the mounting brackets 34 may include an electrical connector 36 that is in selective engagement with an electrical connector 38 of the vehicle 18. The electrical connectors 36, 38 may respectively include a contact 40, 42 that is spring biased into an extended position to facilitate connection between the electrical connector 36 of the mounting bracket 34 and the electrical connector 38 of the vehicle 18.

The contact 40 of the electrical connector 36 is positioned relative to the mounting bracket 34 such that when the mounting brackets 34 are attached to the strikers 30 via the floor-latch mechanisms 28, the contact 40 is aligned with the contact 42 of the vehicle 18. Once the floor-latch mechanism 28 is moved into the latched state and is attached to the strikers 30, the electrical connector 36 of the mounting bracket 34 is in electrical communication with the electrical connector 38 of the vehicle 18 due to engagement between the contacts 40, 42. Because the electrical connector 38 of the vehicle 18 may be in electrical communication with a vehicle wiring harness 44, electrical energy may be supplied to the seat assembly 10 via the vehicle wiring harness 44 and electrical connectors 36, 38.

Supplying the seat assembly 10 with power allows the seat assembly 10 to have various powered features. For example, the seat assembly 10 may include a heating element 46 (FIG. 1) that selectively heats the vehicle seat. While the seat assembly 10 is described as including a heating element 46 to selectively heat the seat assembly 10, the seat assembly 10 could alternatively or additionally include other powered features such as, for example, powered lumbar, powered recline, powered fore/aft adjustment, and powered swivel. Regardless of the particular powered feature installed in the seat assembly 10, connection between the vehicle wiring harness 44 and electrical connectors 36, 38 provides the seat assembly 10 with electrical power and allows such powered features of the seat assembly 10 to operate.

As described above, the floor-latch mechanisms 28 permit selective removal of the seat assembly 10 from the vehicle 18. When the seat assembly 10 is installed in the vehicle 18 and the floor-latch mechanisms 28 are returned to the latched state and engage respective strikers 30 of the vehicle 18, electrical connection between the electrical connector 36 and the electrical connector 38 is automatically established. Because the contact 40 of the electrical connector 36 and the contact 42 of the electrical connector 38 are spring biased into an extended position, when the mounting brackets 34 are received by the strikers 30 of the floor 26, the electrical connector 36 is aligned with the electrical connector 38 such that the contacts 40, 42 are engaged. Engagement between the contacts 40, 42 permits the vehicle wiring harness 44 to supply the seat assembly 10 with power.

With continued reference to FIG. 2, the seat bracket 22 is shown rotatably connected to the floor bracket 20. The seat bracket 22 includes a bottom surface 48 and a top surface 50. The bottom surface 48 generally opposes the floor bracket 20 and the floor 26 of the vehicle 18. The top surface 50 may oppose a bottom of the seat bottom 12 and may be attached thereto by the adjustment mechanism 24.

Figure 8:
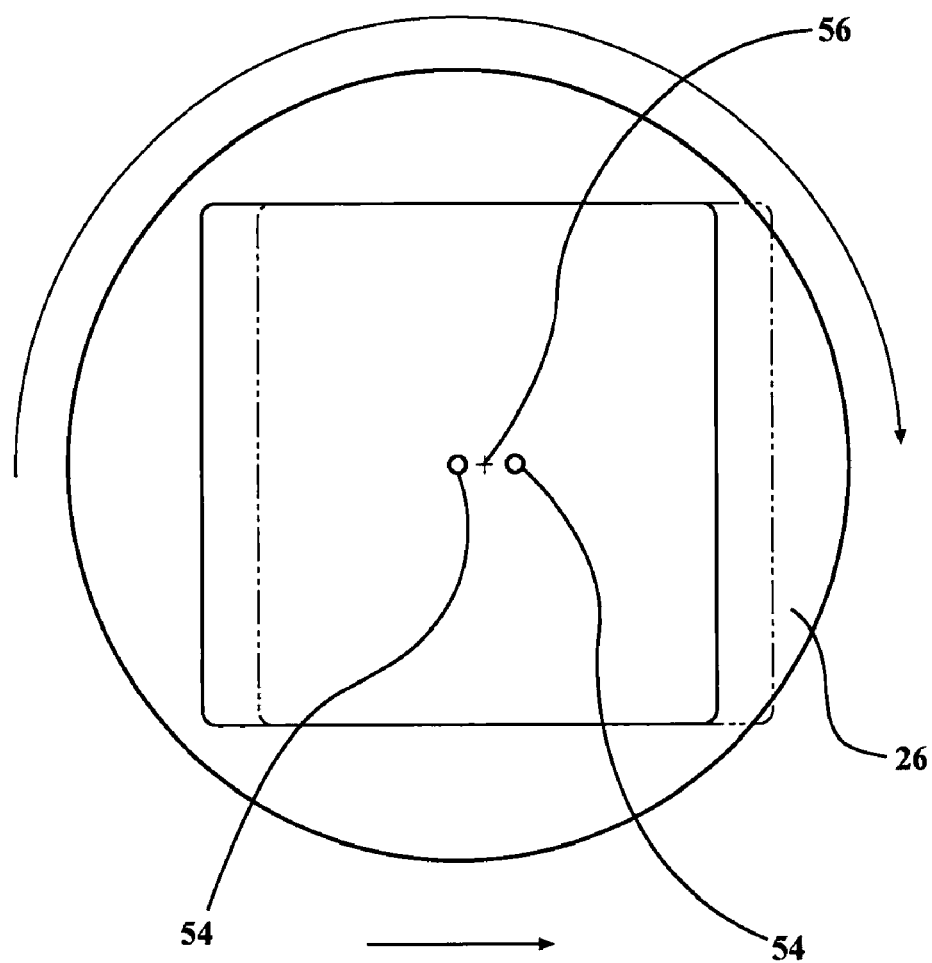
FIG. 8 is a schematic representation of pivotal and translational movement of the seat assembly of FIG. 1 relative to an external structure when pivoted between a first position and a second position.
Figure 9:
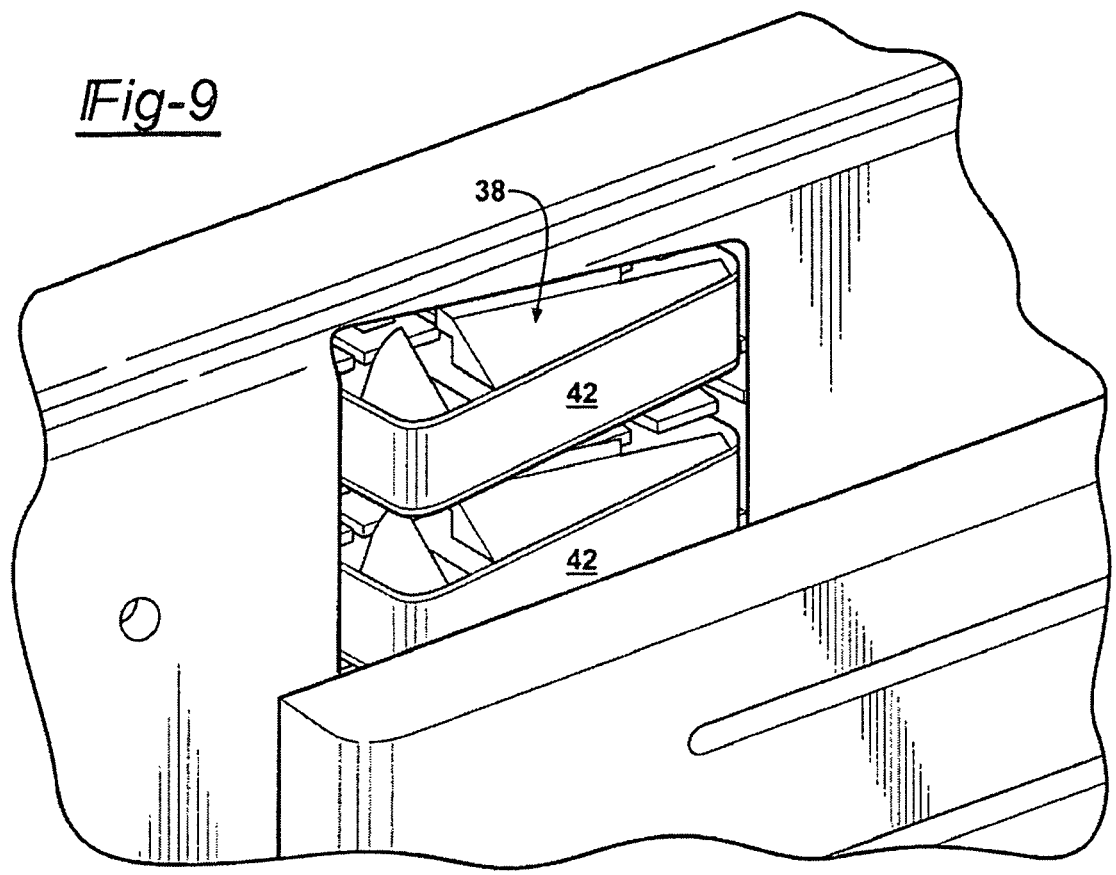
FIG. 9 is a perspective view of an electrical connector for use with the seat assembly of FIG. 1.
Figure 10:
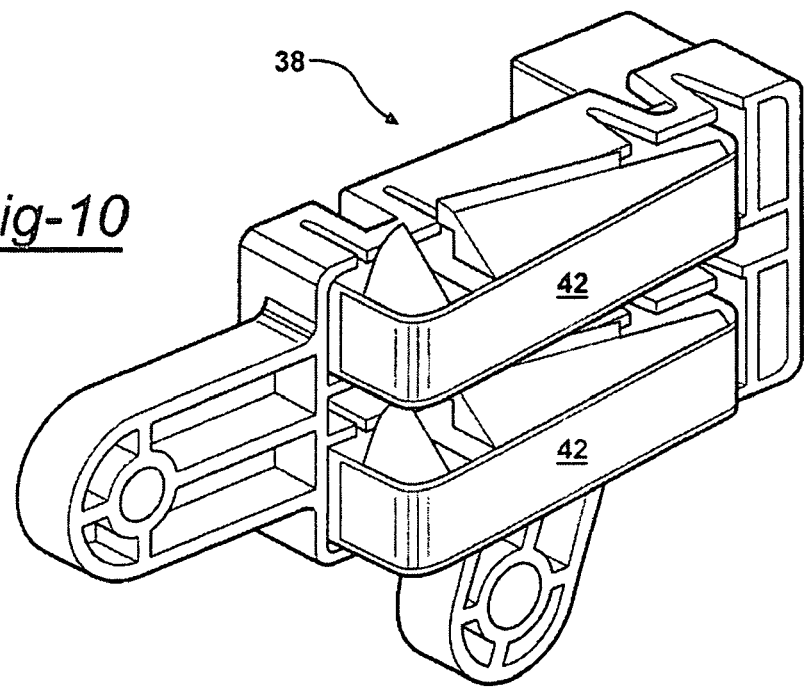
FIG. 10 is a perspective view of an electrical connector for use with the seat assembly of FIG. 1.
Figure 11:
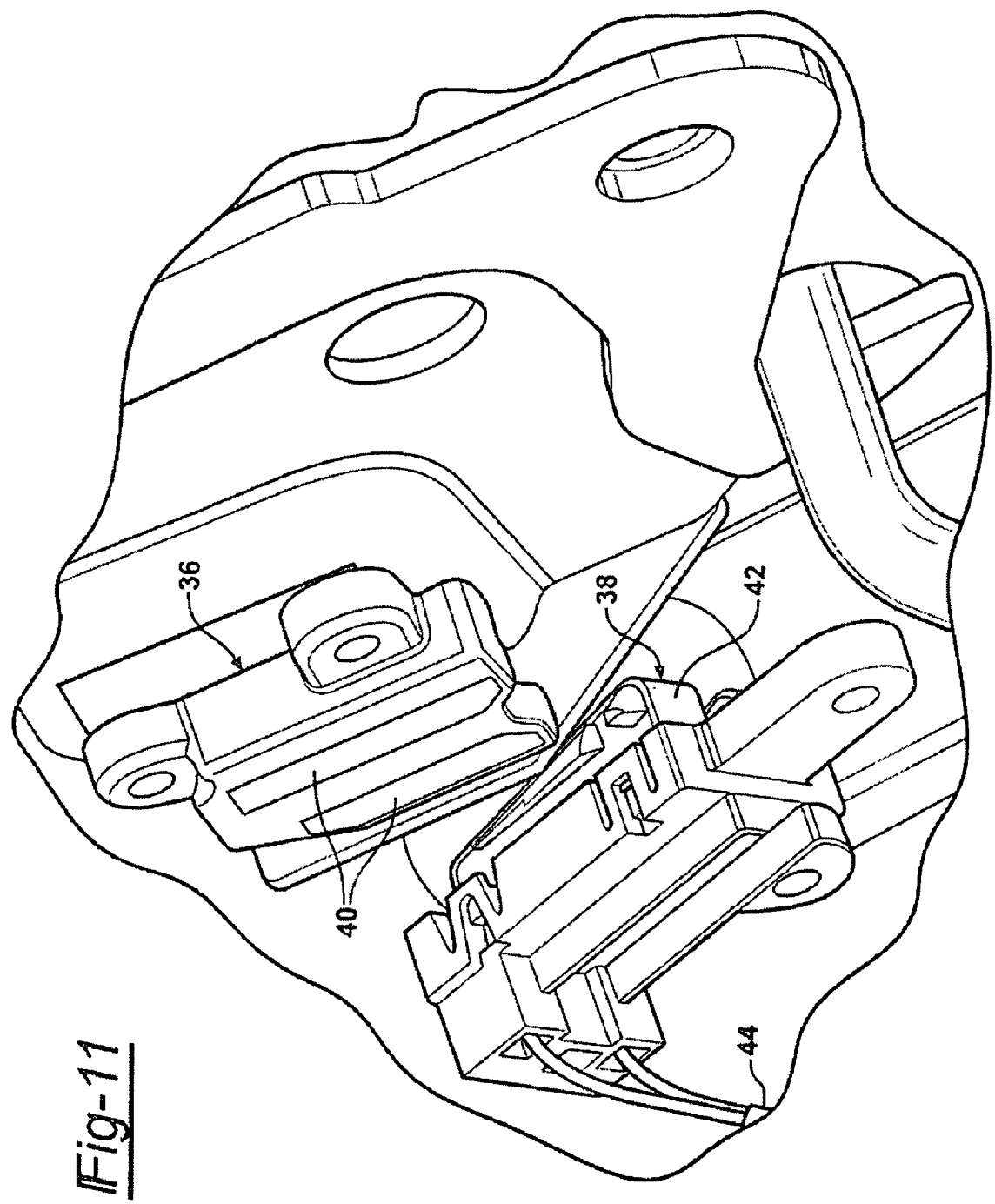
FIG. 11 is a perspective view of an electrical connector assembly for use with the seat assembly of FIG. 1.

The seat bracket 22 may be rotatably supported by the floor bracket 20 and may be rotated between a first position and a second position. The seat bracket 22 may include a central aperture 54 that is rotatably attached to a central aperture 56 of the floor bracket 20, whereby engagement between a flange of each aperture 54, 56 permits relative rotation therebetween. The central aperture 54 may be offset from the central aperture 56 such that the seat bracket 22 is asymmetric to the floor bracket 20 (FIG. 8). In other words, an axis of rotation of the seat bracket 22 is offset from an axis of rotation of the floor bracket 20 such that when the seat bracket 22 is rotated relative to the floor bracket 20, the seat bracket 22 is both rotated and translated relative to the floor bracket 20 (FIG. 8).

The adjustment mechanism 24 may be attached to the mounting assembly 16 generally at the top surface 50 of the seat bracket 22 (FIG. 2). The adjustment mechanism 24 may include a pair of rails 58 disposed on opposite ends of the seat bracket 22 and an adjustment handle 60. The rails 58 may be fixedly attached to the top surface 50 of the seat bracket 22 and may each slidably receive a slider bracket 62. The slider bracket 62 may be fixedly attached to a bottom portion of the seat bottom 12 such that the slider bracket 62 is fixed for movement with the seat bottom 12.

The slider bracket 62 may include a locking feature 64 that locks the slider bracket 62 relative to the rails 58 to selectively prevent movement of the seat bottom 12 relative to the seat bracket 22. The locking features 64 may be in communication with the adjustment handle 60, whereby movement of the adjustment handle 60 between a first position and a second position toggles the locking feature 64 between a locked state and an unlocked state.

For example, when the adjustment handle 60 is moved into a first position, the locking feature 64 may be moved into the unlocked state, thereby permitting fore/aft translation of the seat bottom 12 relative to the seat bracket 22 and vehicle 18. When the adjustment handle 60 is moved from the first position to the second position, the locking feature 64 may be moved from the unlocked state to the locked state to restrict translation of the seat bottom 12 in the fore/aft direction relative to the seat bracket 22 and vehicle 18. A biasing member (not shown), such as, for example, a coil spring, may be in communication with the adjustment handle 60 to bias the adjustment handle 60 into the second position. Biasing the adjustment handle 60 into the second position biases the locking features 64 into the locked state to prevent translation of the seat bottom 12 relative to the seat bracket 22 and vehicle 18.

Figure 4:
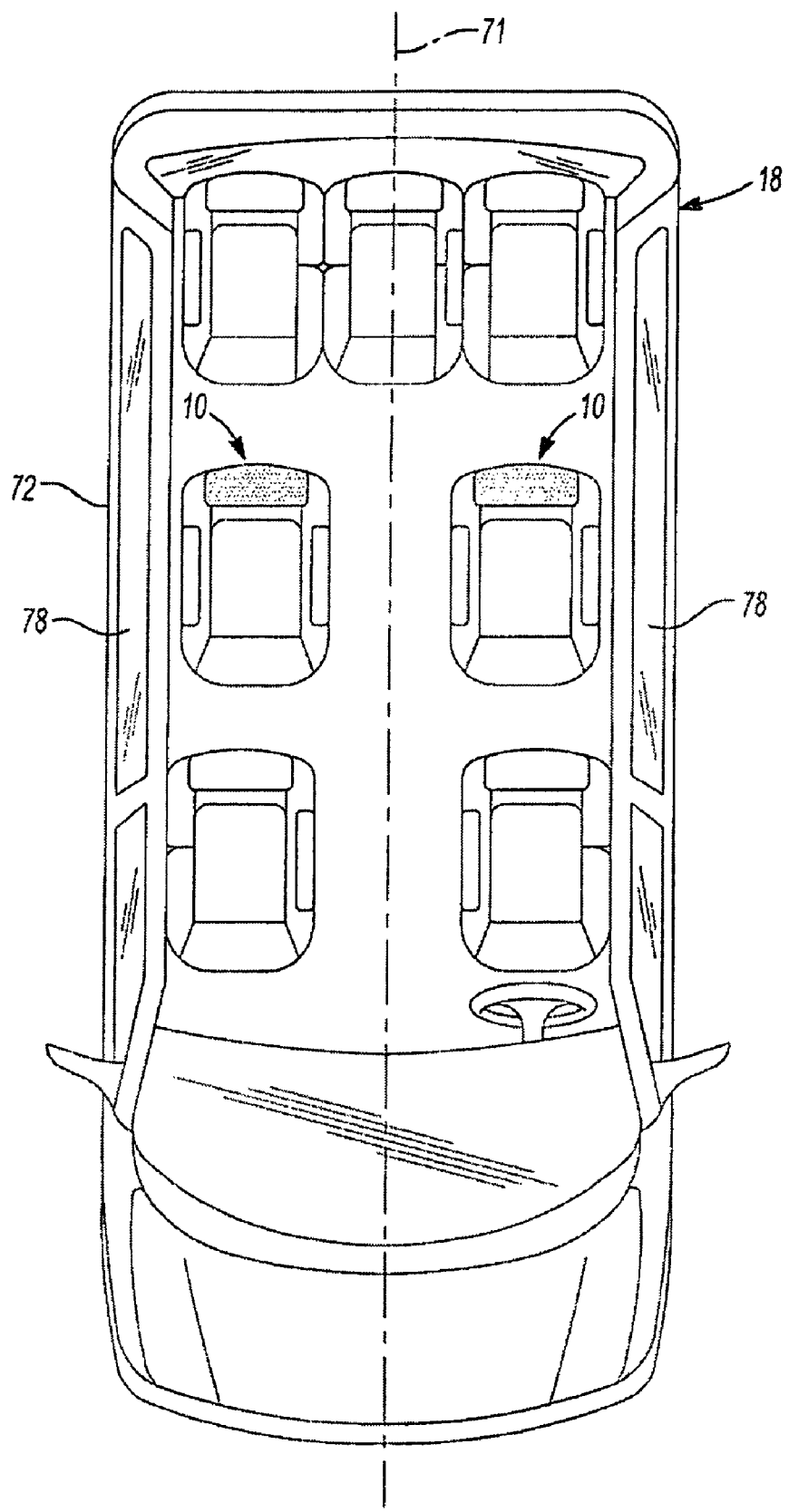
FIG. 4 is a top view of a vehicle with part of a roof removed to show a pair of second-row seat assemblies in a forward-facing position.
Figure 5:
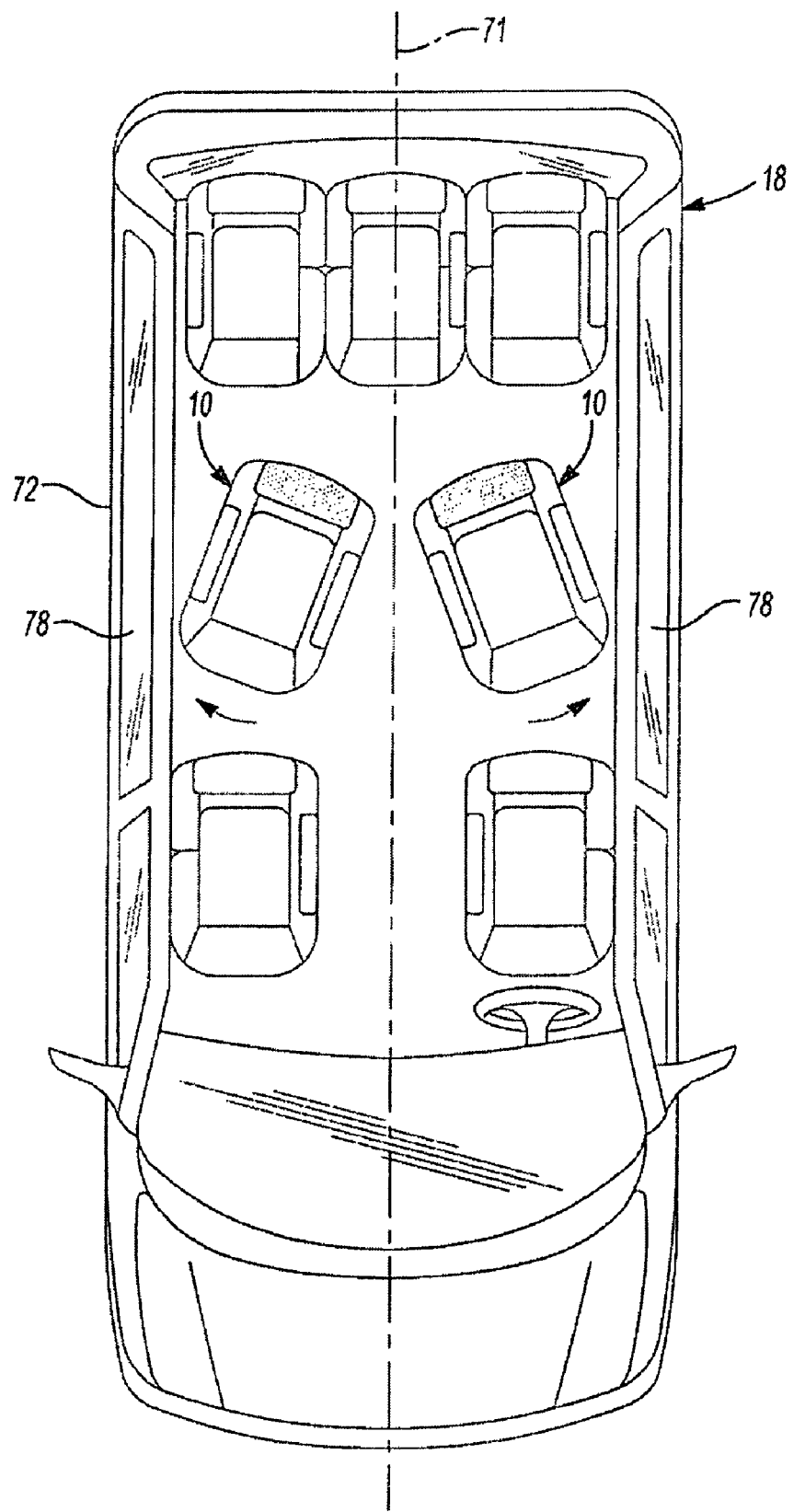
FIG. 5 is a top view of a vehicle with part of a roof removed to show a pair of second-row seat assemblies moving from a forward-facing position to a rearward-facing position.

With particular reference to FIGS. 4 and 5, operation of the seat assembly 10 will be described in detail. When the seat assembly 10 is attached to the vehicle 18, the floor-latch mechanisms 28 of the floor bracket 20 are attached to the strikers 30 such that the floor bracket 20 and, thus, the seat bottom 12, are attached to the floor 26 of the vehicle 18. In this position, the seat assembly 10 is in a usable position.

When the seat assembly 10 is initially installed in the vehicle 18, the seat bottom 12 may be in a forward-facing position such that an occupant seated in the seat assembly 10 will be facing a front row of seats 68 of the vehicle 18 (FIG. 4). A locking mechanism 70 (FIG. 2) may prevent rotation of the seat bottom 12 relative to the floor bracket 20 and, thus, the vehicle 18. A force may be applied to the locking mechanism 70 to toggle the locking mechanism 70 from a locked state to an unlocked state to permit rotation of the seat bottom 12 relative to the floor bracket 20.

Figure 6:
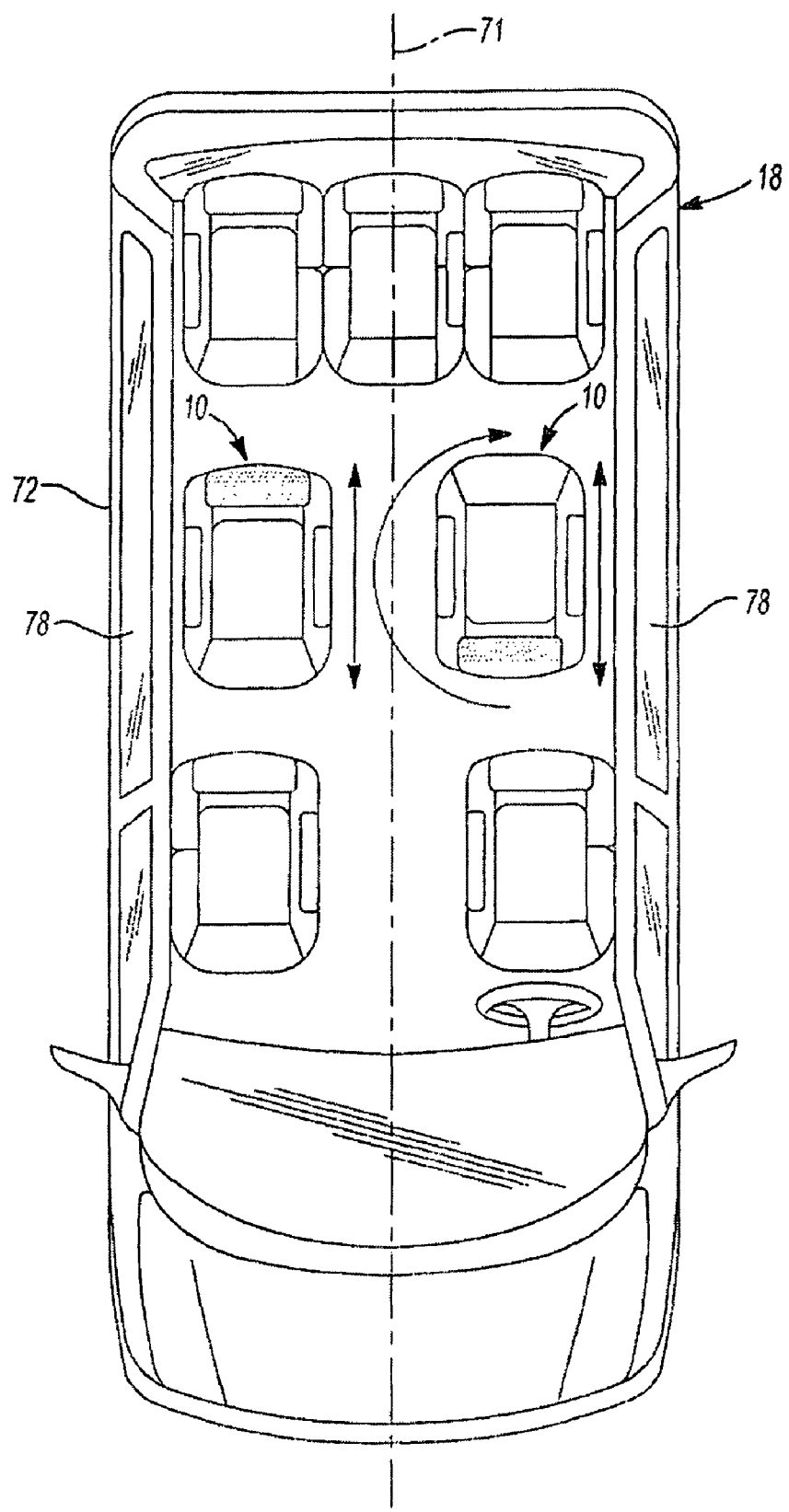
FIG. 6 is a top view of a vehicle with part of a roof removed to show a second-row seat assembly in a rearward-facing and translated position and another second-row seat assembly in a forward-facing and translated position.
Figure 7:
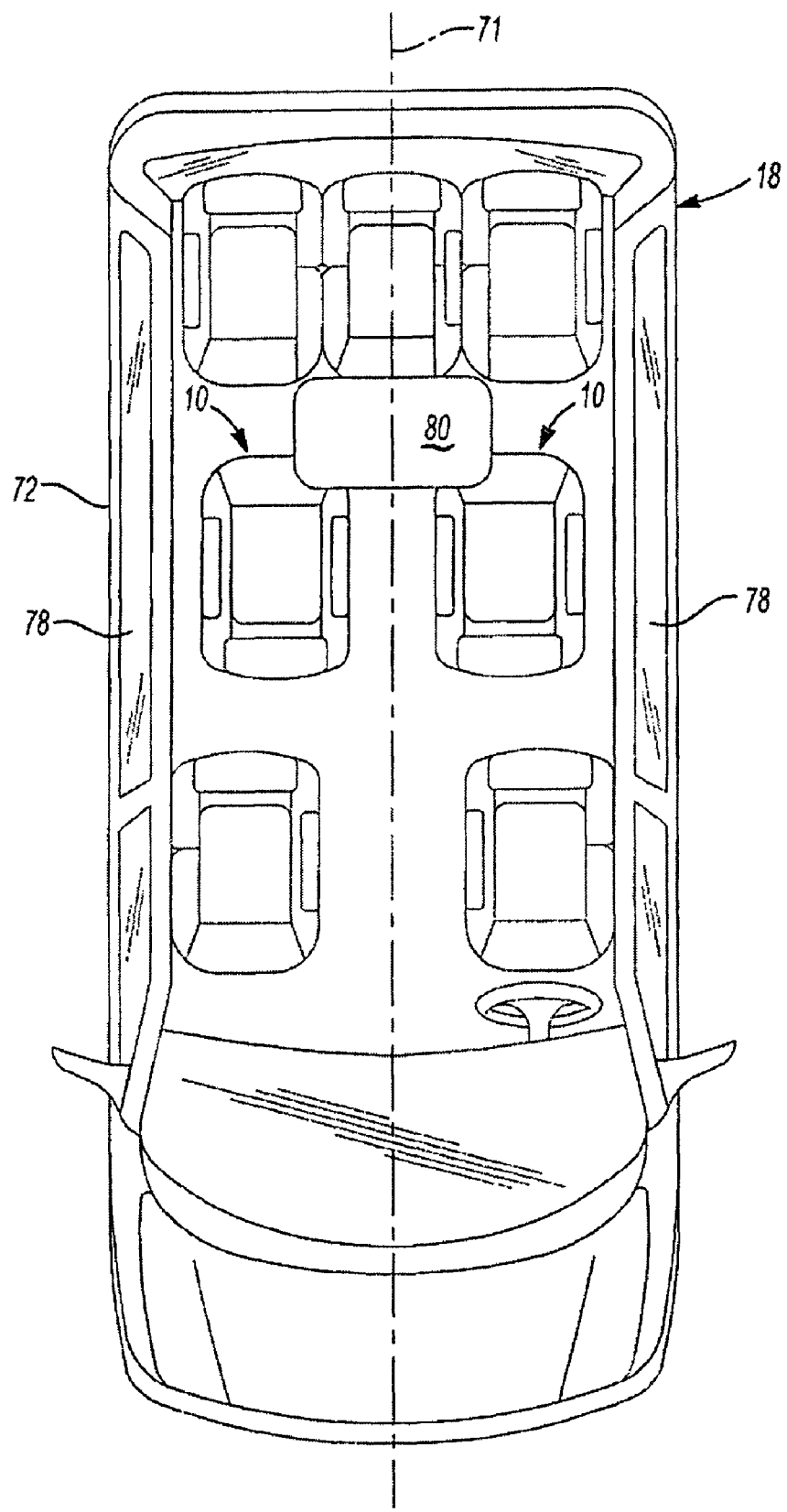
FIG. 7 is a top view of a vehicle with part of a roof removed to show a pair of second-row seat assemblies in a rearward-facing position.

When the locking mechanism 70 is in the unlocked state, a force may be applied generally to the seat assembly 10 either at the seat bottom 12 and/or seatback 14 to rotate the seat bottom 12 and seatback 14 relative to the floor bracket 20 and vehicle 18 (FIGS. 5 and 6). Such force may be applied to the seat bottom 12 and/or seatback 14 to rotate the seat bottom 12 and seatback 14 from the forward-facing position (FIG. 4) to a rearward-facing position (FIG. 7). Rotation of the seat bottom 12 and seatback 14 from the forward-facing position to the rearward-facing position results in rotation of the seat bottom 12 substantially one hundred and eighty degrees.

Once the seat bottom 12 has been rotated substantially one hundred and eighty degrees from the forward-facing position to the rearward-facing position, the locking mechanism 70 may once again be positioned in the locked state to prevent rotation of the seat bottom 12 relative to the floor bracket 20 until the locking mechanism 70 is moved into the unlocked state.

As described above, the seat bracket 22 is asymmetric to the floor bracket 20. As such, when the seat bottom 12 is rotated relative to the floor bracket 20, the seat bottom 12 is not only rotated about an axis of rotation of the seat bracket 22, but is also translated. As shown in FIG. 8, such translation results in movement of the seat bottom 12 generally towards a virtual centerline 71 (FIG. 5) extending along a longitudinal axis of the vehicle 18. In other words, such translation results in the seat bottom 12 moving away from a side 72 of the vehicle 18 and generally towards a center portion of the vehicle 18. Such translation toward a central portion of the vehicle 18 improves the overall ingress/egress of the vehicle 18 when the seat bottom 12 and seatback 14 are in the rearward-facing position.

When the seat bottom 12 is in the rearward-facing position, ingress and egress to the seat bottom 12 is facilitated through use of a seatbelt latch 74 being connected to the seat bottom 12 by a flexible tether 76 (FIG. 1). In one configuration, the tether 76 may be formed of a braided steel cable, whereby a first end of the cable is attached to the seatbelt latch 74 and a second end of the cable is attached generally to the seat bottom 12. Regardless of the particular construction of the tether 76, the flexible nature of the tether 76 allows the seatbelt latch 74 to bend and move out of the way when an occupant is attempting to enter or exit the seat bottom 12. Because the seatbelt latch 74 is located on an outboard side of the seat bottom 12 when the seat bottom 12 is in the rearward-facing position, use of a rigid tether would cause the seatbelt latch 74 to protrude from the seat bottom 12 and restrict such movement into and out of the seat bottom 12 when the seat bottom 12 is in the rearward-facing position. When the seat bottom 12 is in the forward-facing position, the seatbelt latch 74 is disposed generally at an inboard side of the seat bottom 12 and, therefore, does not restrict such entry and exit from the seat bottom 12.

When the seat bottom 12 is in the forward-facing position or the rearward-facing position, a force may be applied to the adjustment handle 60 to selectively move the seat bottom 12 in the fore/aft directions relative to the seat bracket 22 and, thus, to the floor 26 of the vehicle 18. As described above, applying a force to the adjustment handle 60 against the force exerted thereon by the biasing member causes the locking features 64 to be moved into the unlocked state and permits the slider brackets 62 to move relative to the rails 58.

Movement of the slider brackets 62 relative to the rails 58 similarly allows movement of the seat bottom 12 relative to the seat bracket 22 and, thus, allows movement of the seat bottom 12 and seatback 14 relative to the floor 26 of the vehicle 18 in the fore/aft directions. Therefore, regardless of the position of the seat bottom 12 (i.e., whether in the forward-facing position or the rearward-facing position), the seat bottom 12 may be translated relative to the floor 26 of the vehicle 18 by selectively applying a force to the adjustment handle 60 and moving the locking features 64 into the unlocked state. In operation, once the locking features 64 are moved into the unlocked state by applying a force to the adjustment handle 60, a force may be applied to either or both of the seat bottom 12 and the seatback 14 to translate the seat bottom 12 and seatback 14 in the fore-aft directions relative to the vehicle 18.

Figure 1A:
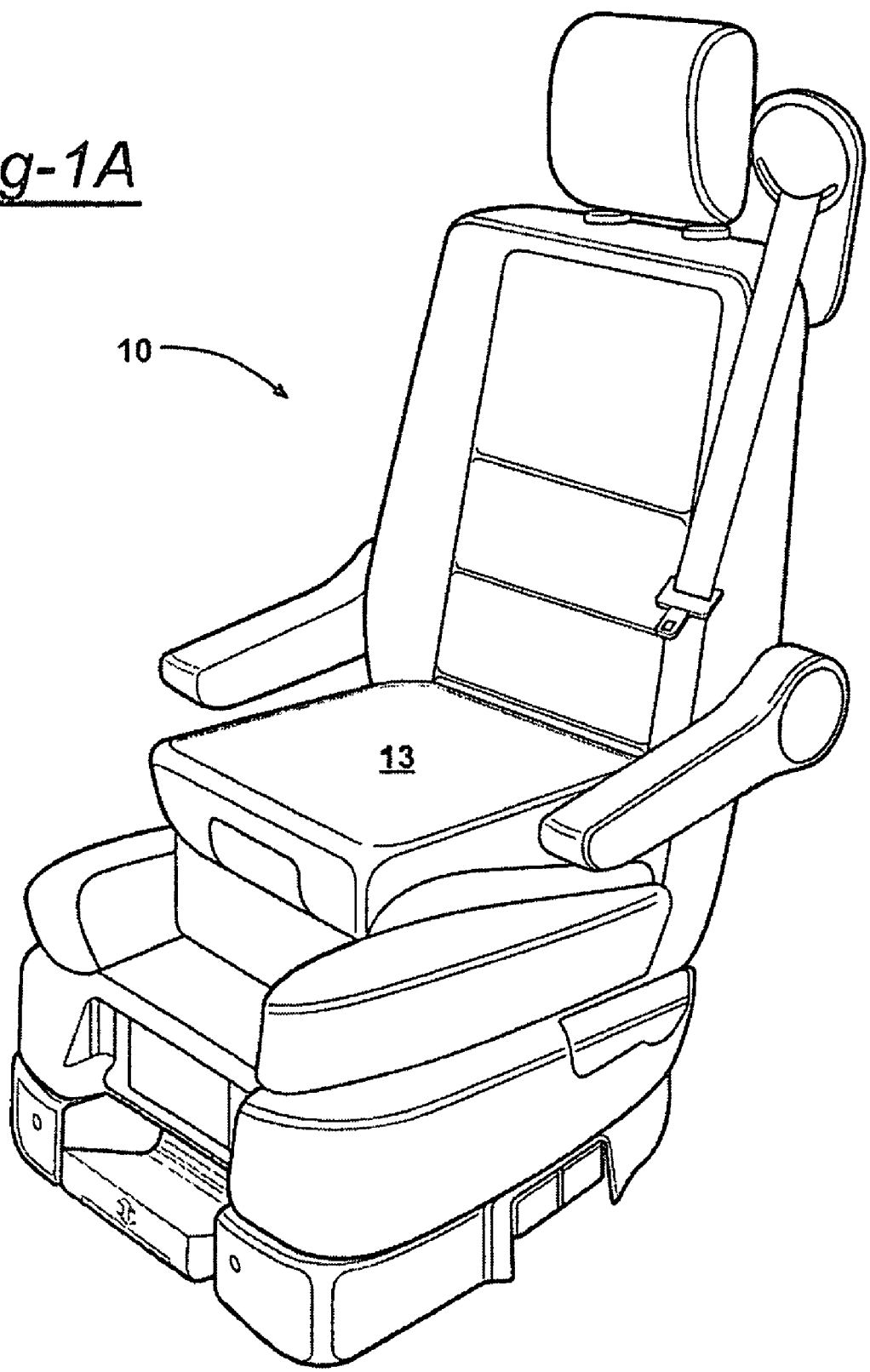
FIG. 1A is a perspective view of a seat assembly in accordance with one embodiment of the present invention and incorporating a child-booster seat into a seat bottom of the seat assembly.

While the seat bottom 12 is described as being translatable relative to the vehicle 18 when the seat bottom 12 is in either the forward-facing position or the rearward-facing position, translation of the vehicle seat may also be accomplished when the seat bottom 12 is disposed in a position generally between the forward-facing position and the rearward-facing position. For example, the seat bottom 12 may be positioned relative to a vehicle side opening 78 such as, for example, a side door of the vehicle 18 to facilitate loading children into the vehicle 18. Loading of children may also be facilitated by including an integrated child booster seat 13 into the seat assembly 10, whereby the booster seat 13 is disposed in either the seat bottom 12 (FIG. 1A) or the seatback 14 (FIG. 1).

When the seat bottom 12 is rotated such that the seat bottom 12 faces the vehicle side opening 78, a force may be applied to the adjustment handle 60 to unlock the locking feature 64 and permit the seat bottom 12 to be translated toward the vehicle side opening 78. Translating the seat bottom 12 towards the vehicle side opening 78 facilitates loading of children, for example, into the seat bottom 12. Once the child is loaded onto the seat bottom 12, the seat bottom 12 may be rotated into the forward-facing position or the rearward-facing position and locked in the forward-facing position or the rearward-facing position by the locking mechanism 70.

The seat bottom 12 is moved generally towards a virtual centerline 71 of the vehicle 18 when the seat bottom 12 is rotated from the forward-facing position to the rearward-facing position. As such, the seat bottom 12 may be moved into closer proximity to vehicle features such as, for example, a table 80 (FIG. 7) that may be attached to the floor 26 of the vehicle 18 when the seat bottom 12 is rotated into the rearward-facing position. Movement of the seat bottom 12 generally closer to the virtual centerline 71 of the vehicle 18 facilitates use of the table 80 when the seat bottom 12 is in the rearward-facing position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat assembly for a vehicle having a floor extending generally along a horizontal plane, the seat assembly comprising:
   a seat bottom;
   a mounting assembly carrying said seat bottom, said mounting assembly having a first portion that releasably attaches to the vehicle floor permitting removal of the entire seat assembly from the vehicle and reinstallation of the entire seat assembly back into the vehicle and a second portion generally overlying said first portion and having an asymmetric relationship with said first portion wherein rotation of said seat bottom relative to said first portion and the vehicle floor is about an axis of rotation extending through said first portion, and said second portion and said seat bottom rotate between a forward-facing position and a rearward-facing position to translate said seat bottom relative to said first portion and the vehicle floor during rotation, wherein the axis of rotation is perpendicular to the floor of the vehicle; and
   a manipulable locking mechanism operative to releasably lock said seat bottom in either said forward-facing position or said rearward-facing position.

2. The seat assembly of claim 1, wherein said forward-facing position is substantially one hundred eighty degrees from said rearward-facing position.

3. The seat assembly of claim 1, wherein said first portion comprises at least one latch mechanism that releasably attaches said first portion of said mounting assembly to the vehicle, said at least one latch mechanism movable between a latched state that maintains engagement of said first portion with the vehicle and an unlatched state permitting removal of said first portion of said mounting assembly from the vehicle.

4. The seat assembly of claim 1, wherein said second portion of said mounting assembly is configured to permit rotation of said seat bottom relative to said first portion in a manner that causes concurrent movement of said seat bottom toward or away from a virtual centerline extending along a longitudinal axis of the vehicle.

5. The seat assembly of claim 1, further comprising an electrical connector attached to said first portion of said mounting assembly that provides the seat assembly with electrical power when said first portion is attached to the vehicle.

6. The seat assembly of claim 5, wherein said electrical connector includes a first contact attached to a structure of the vehicle and a second contact attached to said first portion of said mounting assembly, said first contact in electrical contact with said second contact when said first portion of said mounting assembly is attached to the vehicle to provide the seat assembly with electrical power.

7. The seat assembly of claim 6, wherein at least one of said first contact and said second contact is biased into an extended position so that said first and second contacts remain in electrical connection with respect to each other and supply the seat assembly with electrical power when said seat bottom rotates and translates relative to said first portion of said mounting assembly.

8. The seat assembly of claim 5 further comprises a heating element in said seat bottom, wherein said electrical connector is arranged to couple said heating element to electrical power.

9. The seat assembly of claim 1, wherein said seat bottom includes at least one wheel to facilitate movement of the seat assembly when removed from the vehicle.

10. The seat assembly of claim 1, further comprising a seatbelt latch attached to said seat bottom via a tether that permits movement of said seatbelt latch relative to said seat bottom to facilitate ingress and egress onto said seat bottom when said seat bottom is in a rearward-facing position.

11. The seat assembly of claim 10, wherein said tether is a braided steel cable.

12. The seat assembly of claim 1 wherein said first portion comprises a plurality of floor latch mechanisms that each releasably engages a striker of the vehicle floor, with said floor latch mechanisms movable between a latched state where said floor latch mechanisms are each releasably engaged with a corresponding striker of the vehicle floor, and an unlatched state where said floor latch mechanisms are disengaged from the strikers of the vehicle floor enabling removal of the seat assembly from the vehicle.

13. The seat assembly of claim 1 wherein said locking mechanism comprises a rotation locking mechanism operative to lock said seat bottom in each one of a plurality of seat rotation positions.

14. The seat assembly of claim 13 further comprising a seat slide arrangement enabling linear movement of said seat bottom relative to the vehicle.

15. The seat assembly of claim 1 wherein rotation of said seat bottom relative to said first portion from said forward-facing position toward said rearward-facing position translates said seat bottom closer to a longitudinally extending virtual centerline of the vehicle during rotation.

16. A seat assembly for a vehicle having a floor extending generally along a horizontal plane, the seat assembly comprising:
   a seat bottom;
   a mounting assembly having a first portion that releasably attaches to the vehicle floor permitting removal of the entire seat assembly from the vehicle and reinstallation of the entire seat assembly back into the vehicle and a second portion carrying said seat bottom that is asymmetric with said first portion such that rotation of said second portion and said seat bottom relative to said first portion and the vehicle floor about an axis of rotation extending through said seat bottom between a forward-facing position and a rearward-facing position translates said seat bottom relative to said first portion and the vehicle floor toward a virtual centerline of the vehicle during rotation of said seat bottom from said forward-facing position toward said rearward-facing position; and
   a locking mechanism operative to lock said seat bottom in either said forward-facing position or said rearward-facing position.

* * * * *